Nov. 17, 1925.
C. W. JONES
REFLECTING DEVICE FOR MOTOR VEHICLES
Filed May 4, 1925  2 Sheets-Sheet 1
1,562,335
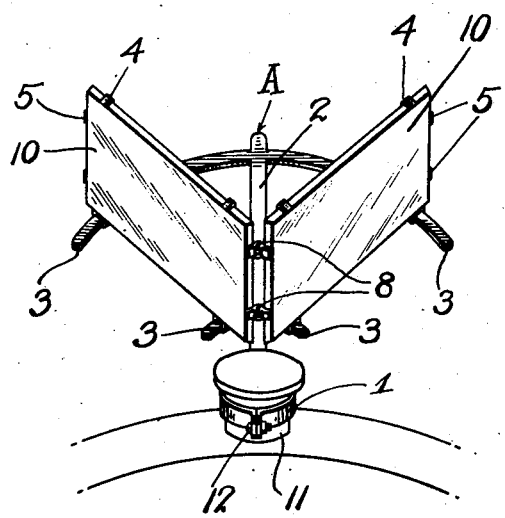
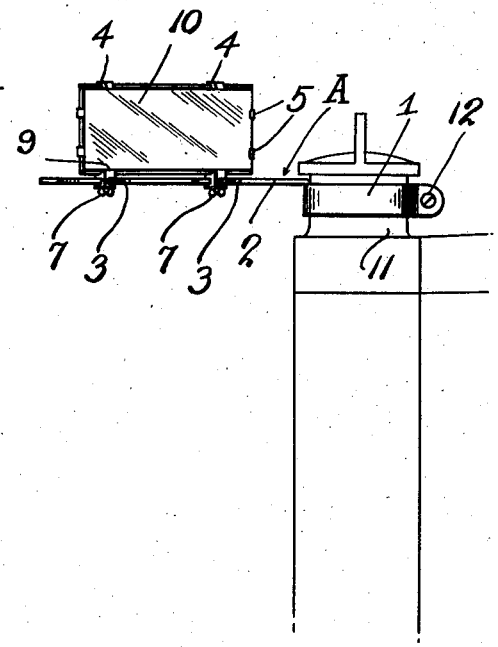
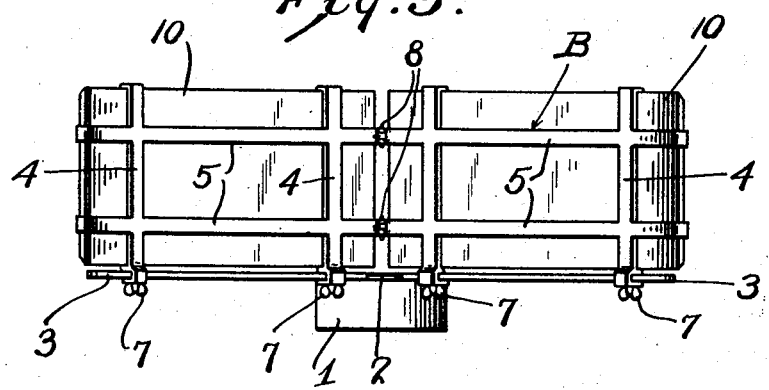
Charles W. Jones
INVENTOR
WITNESS:  ATTORNEY Nov. 17, 1925.
C. W. JONES
1,562,335
REFLECTING DEVICE FOR MOTOR VEHICLES
Filed May 4, 1925    2 Sheets-Sheet 2
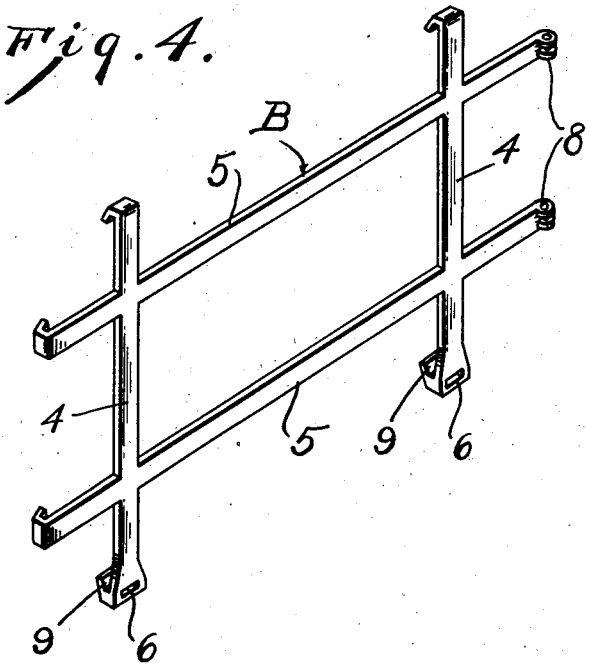
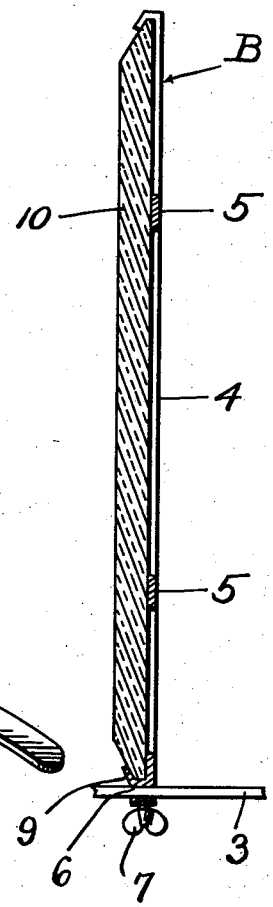
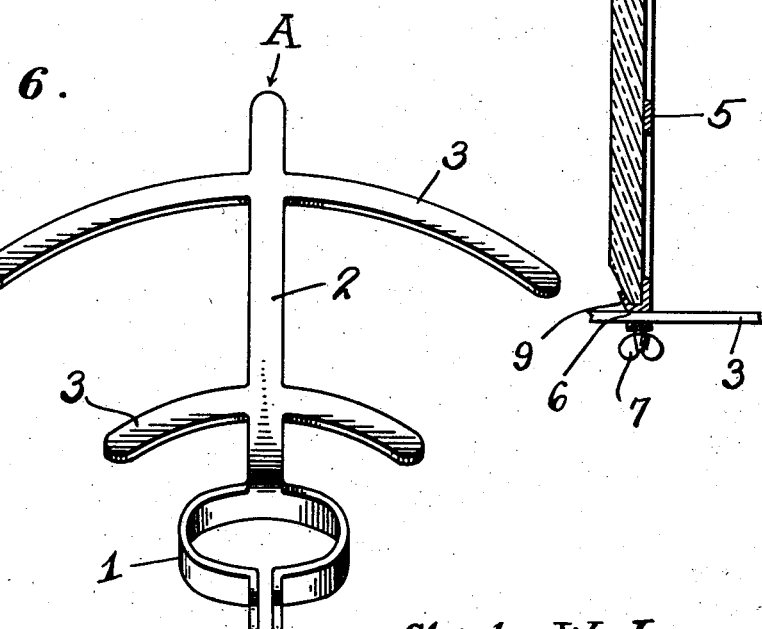
Charles W. Jones
INVENTOR
BY Victor J. Evans
ATTORNEY
WITNESS:

Patented Nov. 17, 1925.

1,562,335

UNITED STATES PATENT OFFICE.

CHARLES WADE JONES, OF SEATTLE, WASHINGTON.

REFLECTING DEVICE FOR MOTOR VEHICLES.

Application filed May 4, 1925. Serial No. 27,945.

*To all whom it may concern:*

Be it known that I, CHARLES W. JONES, a citizen of the United States, residing at Seattle, in the county of King and State of Washington, have invented new and useful Improvements in Reflecting Devices for Motor Vehicles, of which the following is a specification.

This invention relates to a reflecting device for motor vehicles, the general object of the invention being to provide means whereby the driver of the vehicle will be warned of the approach of other vehicles on intersecting roads and on curves, thus avoiding accidents.

Another object of the invention is to provide means whereby the device can be attached to the front part of the vehicle, such as the radiator filling spout or other part where it can be seen by the driver of the vehicle.

With the above and other objects in view, the invention further includes the following novel features and details of construction, to be hereinafter more fully described, illustrated in the accompanying drawings and pointed out in the appended claim.

In the drawings—

Figure 1 is a view showing the device in use.

Figure 2 is a side view of Figure 1.

Figure 3 is a rear view of the device itself.

Figure 4 is a view of one of the side members of the device.

Figure 5 is a sectional view through one of the side members with the mirror in place.

Figure 6 is a perspective view of the base member of the device.

In these views, A indicates the base member of the device and B the two side members thereof. The base member comprises a split ring 1, a bar 2 connected at one end to the ring and two pairs of curved arms 3. Each side member comprises a frame formed of the vertical bars 4 and the cross bars 5. The lower ends of the bars 4 are provided with openings 6 for receiving the arms 3 and the side members are held in adjusted position on the arms by the set screws 7 which pass through holes in the lower ends of the bars 4 and engage the arms. The two frames are hingedly connected together by having hinged parts formed on the inner ends of each set of bars 5 with pins 8 passing through the hinged parts. The bars 4 and 5 are formed with the grooves 9 for receiving the beveled edges of the mirrors 10, each member B supporting a mirror. The ring 1 is adapted to encircle the filling spout 11 of the radiator or other suitable part and to be clamped thereon by the screw 12.

As will be seen from Figures 1 and 2 the apex of the device is placed facing the driver and the mirrors are adjusted so that they will reflect the image of an object approaching the road along which the automobile is moving so that the driver of the vehicle will be warned of the approach of such objects across his path.

The invention is susceptible of various changes in its form, proportions and minor details of construction and the right is hereby reserved to make such changes as properly fall within the scope of the appended claim.

Having described the invention what is claimed is:

A device of the class described comprising a supporting frame consisting of a forwardly extending bar and curved arms connected with the bar and a split ring connected with the inner end of the bar, a pair of side frames hingedly connected together at the inner ends and having slots in the lower ends for receiving the arms, set screws for holding the side frames in adjusted position on the arms and mirrors carried by the side frames.

In testimony whereof I affix my signature.

CHARLES WADE JONES.